Nov. 2, 1948.  R. F. BRENNEN  2,452,986
COLLET AND COLLET CHUCK THEREFOR
Filed Sept. 2, 1943
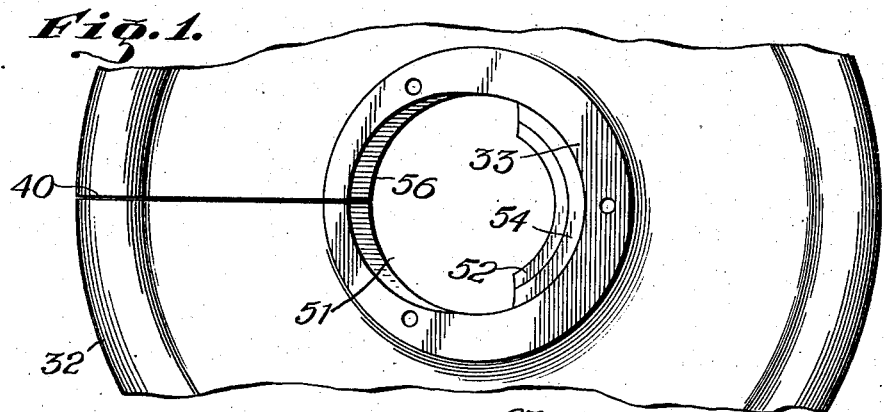
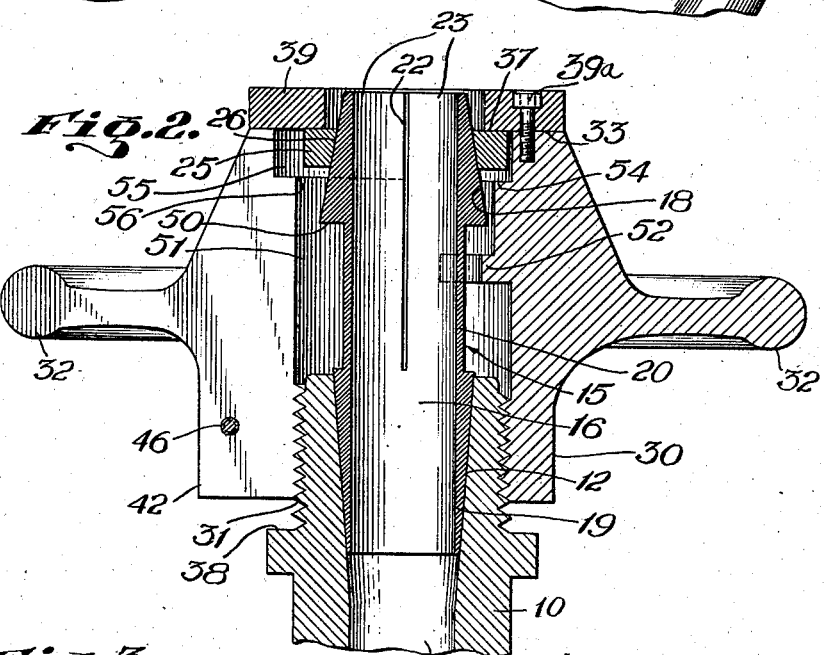
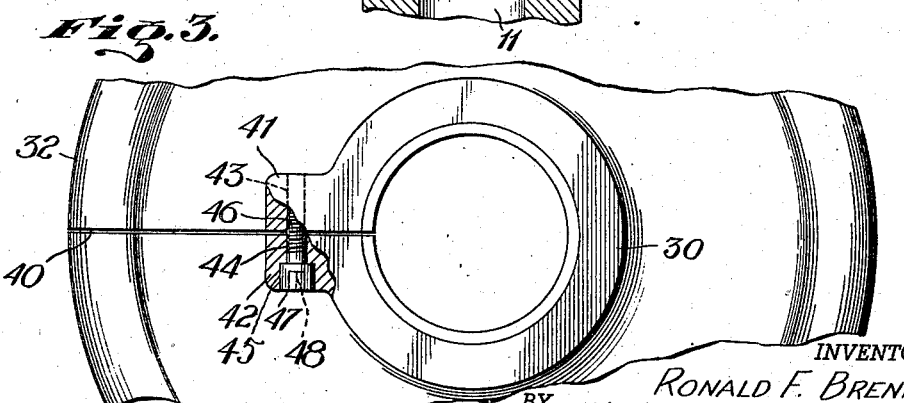
INVENTOR
RONALD F. BRENNEN
BY H. M. Kilpatrick
ATTORNEY Patented Nov. 2, 1948

2,452,986

UNITED STATES PATENT OFFICE 2,452,986

COLLET AND COLLET CHUCK THEREFOR

Ronald F. Brennen, Valley Stream, N. Y., assignor to General Die-Stamping Tool Company, New York, N. Y., a partnership comprised of Richard F. Matshak and David M. Kasson Application September 2, 1943, Serial No. 500,927

8 Claims. (Cl. 279—53)

This invention relates to collets and to collet chucks and more particularly to collets and chucks carried on the forward end of lathe live spindles.

One object of the invention is to provide an improved collet having therein a bore substantially as large as the spindle bore, thereby to carry work as large as the spindle can receive.

Other objects of the invention are to provide an improved method and means for maintaining the collet coaxial with the spindle, improved means for closing the collet, and improved means for removing the collet from the spindle.

Other objects will appear hereinafter.

Additional objects of the invention are to effect simplicity and efficiency in such methods and means and to provide extremely simple devices of this kind which are economical, durable, reliable, easy and accurate in operation, economical to manufacture and easy to install.

Still other objects of the invention will appear as the description proceeds; and while herein details of the invention are described in the specification and some of the claims, the invention as described in the broader claims is not limited to these, and many and various changes may be made without departing from the scope of the invention as claimed in the broader claims.

The inventive features for the accomplishment of these and other objects are shown herein in connection with a collet and chuck which briefly stated, include a collet carried in the outer end taper of a tubular lathe spindle having exterior end threads, and a bore through the spindle, the collet having therein a bore substantially as large in diameter as said spindle bore, said collet having an outwardly pointed outer end cone, having a cone collar fitted thereon. A hand-operated split closing sleeve having threaded engagement with the threads of the spindle and provided with an intermediate hand wheel, carries on its outer end face a closing ring engaged with said collar for drawing the collar onto the cone for closing the collet.

A particular feature of my invention is a practical collet adapted to receive work as large as the bore of the lathe spindle will allow. Collet chucks including collet closing means entirely carried by the work end of the lathe live spindle have been known for many years, but because of the inability to make a practical arrangement that allowed practicable removal of the collet inventors heretofore did not realize the important functional uses and advantages of making a full-capacity collet in which the collet bore was as large as the spindle bore. In practice the tapered inner end portion of the collet in the spindle taper should be strong and rigid and should fit tightly into the taper of the spindle, in order to hold the collet alined with the spindle. This being the case heretofore it was almost impossible to get the collet out of the spindle, even if a shoulder were provided within the collet bore to receive the thrust of a thrust rod driven with a large hammer from the rear of the live spindle.

Heretofore some collets were provided with an inner shoulder, but they could not be made to fit within the taper of the spindle and be as large in diameter throughout as the spindle bore and at the same time be provided with the inner shoulder for their removal, and their inventors did not realize the possibility of making the collet bore as large as the spindle bore. Other collets were made with a small enough inner diameter to leave a butt-end to receive the thrust rod for removing the collet, but these obviously could not have a bore as large as the spindle bore. Other similar collets were provided with longitudinal slits extending well into the taper of the spindle bore, but these were weak and would not hold the alignment, and while not fitting so tightly in the groove, obviously could not have a bore as large as the spindle bore. For these reasons the important functional uses and great advantages of collets that could receive work as large in diameter as allowed by the spindle bore, have not been realized.

As stated above, it has heretofore been practically impossible to remove properly rigid collets from the taper of the spindle, and part of my invention resides in practical means for easily accomplishing this purpose.

For many years inventors have tried to maintain the collet cone and closing ring in chuck accurately alined with the lathe spindle. The strong tapered inner end of my collet maintains the rear part of the collet in perfect alinement with the spindle, and it is only necessary to maintain the inner face of the closing ring perpendicular to the collet axis, to prevent unequal stresses on the collet fingers. This I do by maintaining the closing sleeve alined and free of misalining looseness relative to the spindle, and making the end face of the sleeve perpendicular to said axis of the spindle and collet as herein described. Among other unsuccessful methods, inventors heretofore have attempted to do this by screwing the closing sleeve tightly against an annular shoulder of the lathe spindle, but it has been found that this will not accomplish the purpose, especially after the chuck has been removed and replaced. Threads on lathe spindles are on the whole accurate, and I have found that by eliminating the looseness of the threads themselves and not allowing the sleeve to touch any shoulder, alinement is at all times maintained.

In the accompanying drawing showing, by way of example, one of many possible embodiments of the invention, Fig. 1 is an outer end view of the closing sleeve with the closing ring removed;

Fig. 2 is an axial sectional view showing the assembled spindle collet and chuck;

Fig. 3 is an inner end view of the sleeve, part being in section.

My invention is shown, by way of example, in combination with a lathe tubular live-spindle 10 (Fig. 2) having a bore 11 therethrough having a flared inner face or taper 12 at the work end, receiving a collet 15 having therein a bore 16 substantially as large in diameter as the spindle bore 11, thereby to receive material approximately as large in diameter as the spindle bore 11. Said collet is provided with an outwardly pointed outer end cone 18 at the outer end; a strong thickened inwardly pointed tapered portion 19 at the inner end fitting in the taper 12 of the spindle, a long intermediate portion 20 of small diameter, the collet being longitudinally slitted as at 22 to form spring fingers 23. A closing cone collar 25 has an outwardly pointed inner cone face 26 fitted on said outer end cone 18.

A hand-operated split closing sleeve 30 having threaded engagement with the threads 31 of the spindle 11 is provided with an intermediate hand wheel 32, and with an outer end face 33 substantially flush with the outer face 37 of the cone collar, the inner end of the sleeve terminating short of the shoulder 38 of the spindle 10. An accurately machined strain or closing ring 39 secured by screws 39a on said end face 33 and spaced from the cone 18, engages on the said outer face 37 of said collar 25, whereby rotation of said closing sleeve on the threads may cause said strain or closing ring 39 to draw the cone collar 25 onto the cone to close the collet on the work piece.

Said sleeve 30 with its wheel 32 is provided with a radial split 40 (Fig. 3) extending throughout the wheel and sleeve radially to the axis of the sleeve. Said sleeve includes an inner boss or hub provided on both sides of the split with clamping lugs 41, 42, provided with alined bores 43, 44 respectively provided with threads and with a countersunk end 45 and receiving a clamping screw 46, 47 threadably engaged with the threads of the bore 43 and provided with a head 47 in the countersink having a hexagonal tool receiving opening 48, whereby the operation of the clamping screw causes the sleeves to squeeze the threads with a pressure allowing easy operation of the sleeve when firm force is applied by preventing any longitudinal or misalining looseness and movement on the threads, whereby after the sleeve is adjusted to its approximate final position the outer face 33 may be accurately machined on a lathe to a position accurately perpendicular to the axis of the spindle to accurately receive the inner face of the closing ring, whereby after removal and replacement of the closing sleeve with the ring 39 thereon, the inner face of the ring will accurately take a position perpendicular to the collet axis leaving the closing collar 25, entirely free of any lateral stress tending to unbalance the forces on the collet fingers or misaline the collet or the material therein.

In practice the collet coaxially fits in the taper 12 extremely tightly; and in order to get the collet out, especially the full-capacity collet having no interior shoulder, I provide the means now to be described.

The inner end of the cone 18 is provided with an inwardly facing annular shoulder 50 around the collet. The bore 51 of said sleeve 30, being about the same in diameter as the bottom of its threads, is spaced from the collet, and is provided a short distance inwardly of said shoulder 50 with a collet-removing arcuate ledge 52 extending nearly half way around the bore and near enough to the small part 20 of the collet to engage said shoulder 50 as the closing sleeve is unscrewed from the spindle, thereby to remove the collet from the taper 12.

Said bore 51 is provided near the inner flat face of the collar 20 with a shallow ledge 54, and diametrically opposite to said shallow ledge, with the eccentric cut-out groove 55, the distance from said ledge 54 to the edge 56 of said groove being less than the diameter of the cone collar 20, to prevent the latter from dropping into the bore 51 when the collet is being assembled while the strain ring 39 is in place. Said eccentric groove 55 allows the cone collar to move into it to allow the collet cone 18 being assembled into, or disassembled from, the collar to move laterally to clear the removing ledge 52.

While herein, a collet having a bore as large as the bore of the spindle is disclosed, for smaller work, the outer end part of the collet bore may be of smaller diameter.

The operation of my improved collet, chuck and method will be readily understood, from the foregoing, and now need be only briefly summarized as follows:

The desired collet is selected and placed in the sleeve 30 with the shoulder 50 disposed beyond the ledge 52 approximately in the relative positions shown in Fig. 2. Then this assembly is positioned to cause the tapered end 19 to enter the taper of the spindle bore; and the sleeve 30 is screwed on the spindle and the screw 46, 47 tightened to cause the sleeve to engage the spindle with an easy tight fit that eliminates all looseness, after which the sleeve is turned on the spindle to stop short of the shoulder 38 and to project slightly beyond the outer face 33 of the collar and machined off accurately, after which the closing ring is secured in place. After this, the work may be placed in the collet and the sleeve adjusted to clamp the collet on the work piece.

With the device constructed as thus described, the closing ring 39 will remain accurately perpendicular to the axis of the collet and spindle, both before removal and after replacement.

When it is desired to remove a collet, the sleeve 30 is merely removed, the ledge 52 engaging the collet shoulder 50 and easily drawing the collet with the sleeve, the ledge 54 and the edge 56 holding the cone collar from falling into the bore, the groove 55 allowing the collar and with it the collet, to move to allow the collet cone to clear the ledge 52 during removal, replacement or interchange of the collet.

The invention claimed is:

1. In combination, a tubular spindle having exterior end threads and an adjacent shoulder, and having a bore through the spindle having a flared inner face at the work end; a tubular collet fitting in the flare and having longitudinal slits and an outwardly pointed outer end cone; a cone collar fitted on said cone; a hand-operated split closing sleeve having threaded engagement with the threads of the spindle and terminating short of said shoulder of the spindle and provided with an intermediate hand wheel, and with an outer end face substantially flush with the outer face of the cone collar; an accurately machined strain ring secured on said end face and engaged on the said outer face of said collar and spaced from the cone; said sleeve and its wheel having a split radial to the axis of the sleeve, and an inner boss provided on both sides of the split with clamping lugs; a clamping screw passing through the lugs for causing the threads of the sleeve to squeeze the spindle threads with a pressure allowing easy operation but preventing looseness.

2. The combination, with a live spindle having exterior end threads and an end bore, of a collet fitting in the bore and having an outwardly pointed outer end cone having an inwardly facing shoulder; a cone collar fitted on said cone; a closing-sleeve having threaded engagement with said threads and provided at its outer end with a closing ring engageable with the outer face of said collar; the bore of said sleeve being provided with an intermediate ledge adapted to engage said shoulder as the closing screw is being unscrewed, thereby to remove the collet.

3. A combination as in claim 2, said sleeve bore having near the inner flat face of the collar, a shallow ledge, and opposite to said shallow ledge, a groove, the distance from the shallow ledge to the inner edge of said groove being less than the diameter of the collar.

4. In a combination as in claim 2, the sleeve being provided near the outer end of the sleeve bore with means holding the collar from inward movement and allowing lateral movement of the collar.

5. A closing-sleeve having internal threads at the inner end and provided with an outer end face substantially perpendicular to the axis of the sleeve; the bore of said sleeve being provided near the outer end with a ledge faced toward said outer end; said bore having between said ledge and said outer end a shallow ledge, and opposite to said shallow ledge, a groove.

6. The combination, with a live spindle having exterior end threads and a coaxial tapered end bore, of a tubular collet fitting in the end bore and having an outwardly pointed outer end cone; a cone collar fitted on said cone; a closing-sleeve having threaded engagement with said threads and a ring engageable with the outer face of said collar; said sleeve being provided with means adapted to engage said cone as the closing screw is being unscrewed, thereby to remove the collet.

7. An assembly accurately mounting an accurately machined actuating ring relative to a cone collar fitted on the outwardly pointed outer end of a collet coaxially fitted in the outer end of a live spindle, having exterior threads, said assembly comprising said ring, said spindle, said collet therein, said cone collar thereon, and a closing sleeve screwed without looseness upon said threads with the inner ends short of the inner ends of the threads and its outer end disposed adjacent to the outer end face of the collar; the outer end face of the outer end of the sleeve being accurately so machined that when the spindle is rotated, the outer end face of the sleeve will be flush with the outer end face of the collar and in a single plane perpendicular to the axis of rotation of the spindle; said actuating ring being mounted on said end face in position to engage with the outer face of the collar; whereby after removal and replacement of the sleeve with the ring against the collar the ring will accurately take its position perpendicular to the axis of the spindle when against said collar.

8. An assembly comprising a collet having an outwardly pointed outer end cone; an exteriorly threaded live spindle into the outer end of which the collet is fitted; a cone collar fitted on said outer end cone; a closing sleeve screwed without looseness upon the threads of the spindle with the inner ends short of the inner ends of the threads and the outer end face of its outer end disposed adjacent to the outer end face of the collar the outer end face of the sleeve being accurately so machined that when the spindle is rotated, the outer end face of the sleeve will be flush with the outer end face of the collar and always in a single plane perpendicular to the axis of rotation of the spindle; said actuating ring being mounted on the machined end face of the sleeve in position to engage with the outer face of the collar; whereby after removal and replacement of the sleeve with the ring against the collar, the ring will accurately take its position perpendicular to the axis of the spindle.

RONALD F. BRENNEN.

REFERENCES CITED

The following references are of record in the file of this patent:

UNITED STATES PATENTS

| Number | Name | Date |
| --- | --- | --- |
| 442,230 | Libby | Dec. 9, 1890 |
| 685,963 | Allen | Nov. 5, 1901 |
| 714,896 | Hanson | Dec. 2, 1902 |
| 1,044,299 | Trundle | Nov. 12, 1912 |
| 1,081,183 | Wood | Dec. 9, 1913 |
| 1,100,327 | Remington | June 16, 1914 |
| 1,465,257 | Drissner | Aug. 21, 1923 |
| 1,789,601 | Sjogren | Jan. 20, 1931 |
| 1,939,242 | Thaheld | Dec. 12, 1933 |
| 2,156,692 | Hixon | May 2, 1939 |

OTHER REFERENCES

Wright, in "'American Machinist," vol. 59, No. 26, page 960, Dec. 27, 1923. (Copy in Class 279—46.)

"Running a Regal," a lathe manual by the R. K. Le Blond Machine Tool Co., Cincinnati, 1942. Price 25¢. Pages 56, 57, and 58. (Copy in Div. 13.)